US011535230B2

(12) United States Patent
Higuchi et al.

(10) Patent No.: US 11,535,230 B2
(45) Date of Patent: Dec. 27, 2022

(54) FUEL ECONOMY DISPLAY CONTROL METHOD AND FUEL ECONOMY DISPLAY CONTROL SYSTEM

(71) Applicant: Nissan Motor Co., Ltd., Yokohama (JP)

(72) Inventors: Shinsuke Higuchi, Kanagawa (JP); Kazuhiko Okino, Kanagawa (JP); Ryuzou Noguchi, Kanagawa (JP); Junji Miyachi, Kanagawa (JP); Tetsuya Shinohara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 128 days.

(21) Appl. No.: 16/771,980

(22) PCT Filed: Dec. 15, 2017

(86) PCT No.: PCT/JP2017/045219
§ 371 (c)(1),
(2) Date: Jun. 11, 2020

(87) PCT Pub. No.: WO2019/116585
PCT Pub. Date: Jun. 20, 2019

(65) Prior Publication Data
US 2020/0398814 A1 Dec. 24, 2020

(51) Int. Cl.
*B60W 20/00* (2016.01)
*B60K 35/00* (2006.01)
(Continued)

(52) U.S. Cl.
CPC .............. *B60W 20/00* (2013.01); *B60K 35/00* (2013.01); *B60W 10/06* (2013.01); *B60W 10/08* (2013.01);
(Continued)

(58) Field of Classification Search
CPC ...... B60W 20/00; B60W 10/06; B60W 20/10; B60W 10/10; B60W 50/0097;
(Continued)

(56) References Cited

U.S. PATENT DOCUMENTS

2009/0157244 A1* 6/2009 Kim ..................... B60W 10/06
903/930
2010/0082190 A1* 4/2010 Jinno ..................... B60K 6/543
701/22

(Continued)

FOREIGN PATENT DOCUMENTS

JP   S58-063697 U   4/1983
JP   2005-035413 A   2/2005
(Continued)

*Primary Examiner* — Yuri Kan
(74) *Attorney, Agent, or Firm* — Young Basile Hanlon & MacFarlane, P.C.

(57) ABSTRACT

A fuel economy display control method for a hybrid vehicle includes driving electric power supplied to a travel motor from a battery is generated by an electric power generation device that generates electric power by consuming fuel. The fuel economy display control method includes an electric power economy computation step in which instantaneous electric power economy according to an output of the travel motor is computed, a fuel economy computation step in which instantaneous fuel economy corresponding to the above instantaneous electric power economy is computed in accordance with an operating state set for the electric power generation device, and a display step in which the instantaneous fuel economy is displayed on a display device arranged inside a vehicle cabin.

20 Claims, 10 Drawing Sheets

(51) Int. Cl.
  *B60W 10/06* (2006.01)
  *B60W 10/08* (2006.01)
  *B60W 10/24* (2006.01)
  *B60W 50/14* (2020.01)
(52) U.S. Cl.
  CPC ............ *B60W 10/24* (2013.01); *B60W 50/14* (2013.01); *B60K 2370/169* (2019.05); *B60W 2050/146* (2013.01); *B60W 2510/244* (2013.01)
(58) Field of Classification Search
  CPC ....... B60W 10/08; B60K 6/445; B60K 35/00; B60R 16/0236; B60L 50/40; G01F 9/023
  See application file for complete search history.

(56) References Cited

U.S. PATENT DOCUMENTS

| | | | | |
|---|---|---|---|---|
| 2010/0106352 | A1* | 4/2010 | Skaff | B60K 6/445 701/22 |
| 2011/0010030 | A1* | 1/2011 | Yamamoto | B60K 6/445 903/903 |
| 2011/0125357 | A1* | 5/2011 | Harumoto | B60L 58/10 701/22 |
| 2012/0101671 | A1* | 4/2012 | Caouette | B63H 21/383 701/21 |
| 2013/0090792 | A1* | 4/2013 | Eom | B60R 16/0236 701/22 |
| 2013/0278404 | A1* | 10/2013 | Choi | B60K 37/02 340/438 |
| 2014/0095060 | A1* | 4/2014 | Heo | B60L 58/12 701/123 |
| 2014/0142836 | A1 | 5/2014 | Yabuta | |
| 2014/0200793 | A1* | 7/2014 | Dufford | B60W 40/12 701/103 |
| 2014/0229048 | A1* | 8/2014 | Kawata | B60L 50/40 180/65.265 |
| 2015/0006001 | A1* | 1/2015 | Kawata | B60W 10/10 180/65.265 |
| 2015/0254107 | A1* | 9/2015 | Lavery | G06F 3/04847 715/772 |
| 2015/0291036 | A1* | 10/2015 | Ryu | B60L 7/00 701/22 |
| 2015/0345958 | A1* | 12/2015 | Graham | G06Q 10/1095 701/22 |
| 2015/0367731 | A1* | 12/2015 | Amano | B60R 16/0236 701/36 |
| 2016/0049023 | A1* | 2/2016 | Stinchcombe | B60L 50/16 701/115 |
| 2016/0176311 | A1* | 6/2016 | Liggins | H02J 7/0047 324/435 |
| 2016/0272220 | A1* | 9/2016 | Ichikawa | B60W 50/14 |
| 2017/0008525 | A1* | 1/2017 | Ko | B60W 30/18127 |
| 2017/0015328 | A1* | 1/2017 | Oguri | B60W 50/0097 |
| 2017/0072799 | A1* | 3/2017 | Skaff | G01D 7/04 |
| 2018/0208174 | A1* | 7/2018 | Kim | B60W 50/0097 |
| 2018/0253990 | A1* | 9/2018 | Skaff | B60K 35/00 |

FOREIGN PATENT DOCUMENTS

| | | | | |
|---|---|---|---|---|
| JP | 3646987 | B2 * | 5/2005 | |
| JP | 3780504 | B2 * | 5/2006 | ............. B60L 15/20 |
| JP | 2007-269257 | A | 10/2007 | |
| JP | 2009-055675 | A | 3/2009 | |
| JP | 2013-032152 | A | 2/2013 | |
| JP | 2014-101103 | A | 6/2014 | |
| JP | 2016-193686 | A | 11/2016 | |

\* cited by examiner

FUEL ECONOMY DISPLAY CONTROL METHOD AND FUEL ECONOMY DISPLAY CONTROL SYSTEM

TECHNICAL FIELD

The present invention relates to a fuel economy display control method and a fuel economy display control system.

BACKGROUND ART

As a vehicle in which an engine serves as a driving source, there is known a vehicle in which instantaneous fuel economy is computed in accordance with an operating state of the engine and displayed for a driver inside a vehicle cabin. Also, JP2013-032152A discloses a method for calculating a distance to empty per unit electric power consumption (electric power economy) based on electric power of a battery, the electric power being consumed due to traveling, and charged electric power by regeneration in a vehicle in which a travel motor is driven by electric power from the battery (an EV).

SUMMARY OF INVENTION

In recent years, a hybrid vehicle has been developed in which driving electric power supplied to a travel motor is generated by electric power generated due to driving of an engine.

This type of hybrid vehicle is able to travel with use of driving force of the travel motor alone, and, since the engine basically does not serve as a traveling driving source while the vehicle is traveling with use of the travel motor, an accelerator pedal operation amount and an output of the engine (a fuel consumption amount) are not directly linked to each other.

Therefore, even though instantaneous fuel economy is displayed, it is difficult for a driver to realize changes in fuel economy linked to the driver's own accelerator pedal operation. Therefore, an effect of encouraging the driver to perform a driving operation (the accelerator pedal operation) while making the driver be conscious of eco-driving is lowered.

Meanwhile, even though electric power economy (instantaneous electric power economy) in accordance with fluctuating outputs of the travel motor (accelerator pedal operation amounts) is displayed, the driver or the like is not able to instinctively recognize a relation between the electric power economy and consumption efficiency of fuel to be supplied, and the effect of encouraging the driver to perform the driving operation while making the driver be conscious of eco-driving is lowered as well.

The invention has been accomplished in consideration of these situations, and an object thereof is to provide a fuel economy display control method and a fuel economy display control system in a hybrid vehicle, by which a driver is favorably encouraged to perform a driving operation while being conscious of eco-driving.

Means for Solving the Problem

An aspect of the invention provides a fuel economy display control method for a hybrid vehicle in which driving electric power supplied to a travel motor from a battery is generated by an electric power generation device that generates electric power by consuming fuel. The fuel economy display control method includes an electric power economy computation step in which instantaneous electric power economy according to an output of the travel motor is computed. The fuel economy display control method also includes a fuel economy computation step in which instantaneous fuel economy corresponding to the instantaneous electric power economy is computed in accordance with an operating state set for the electric power generation device. Further, the fuel economy display control method includes a display step in which the instantaneous fuel economy is displayed on a display device arranged inside a vehicle cabin.

Another aspect of the invention provides a fuel economy display control system installed in a hybrid vehicle in which a battery is charged with electric power generated by an electric power generation device that generates electric power by consuming fuel, and driving electric power is supplied to a travel motor from the battery. The fuel economy display control system includes a display device that displays a travel distance with respect to given fuel consumption as instantaneous fuel economy; and a display control device that computes the instantaneous fuel economy. Further, the display control device computes instantaneous electric power economy from a travel distance with respect to electric power consumption of the travel motor, and displays the instantaneous electric power economy or a value obtained by correcting the instantaneous electric power economy with a given factor, as the instantaneous fuel economy on the display device.

DESCRIPTION OF EMBODIMENTS

First Embodiment

Hereinbelow, a first embodiment of the invention is described with reference to FIG. 1 to FIG. 6.

Figure 1:
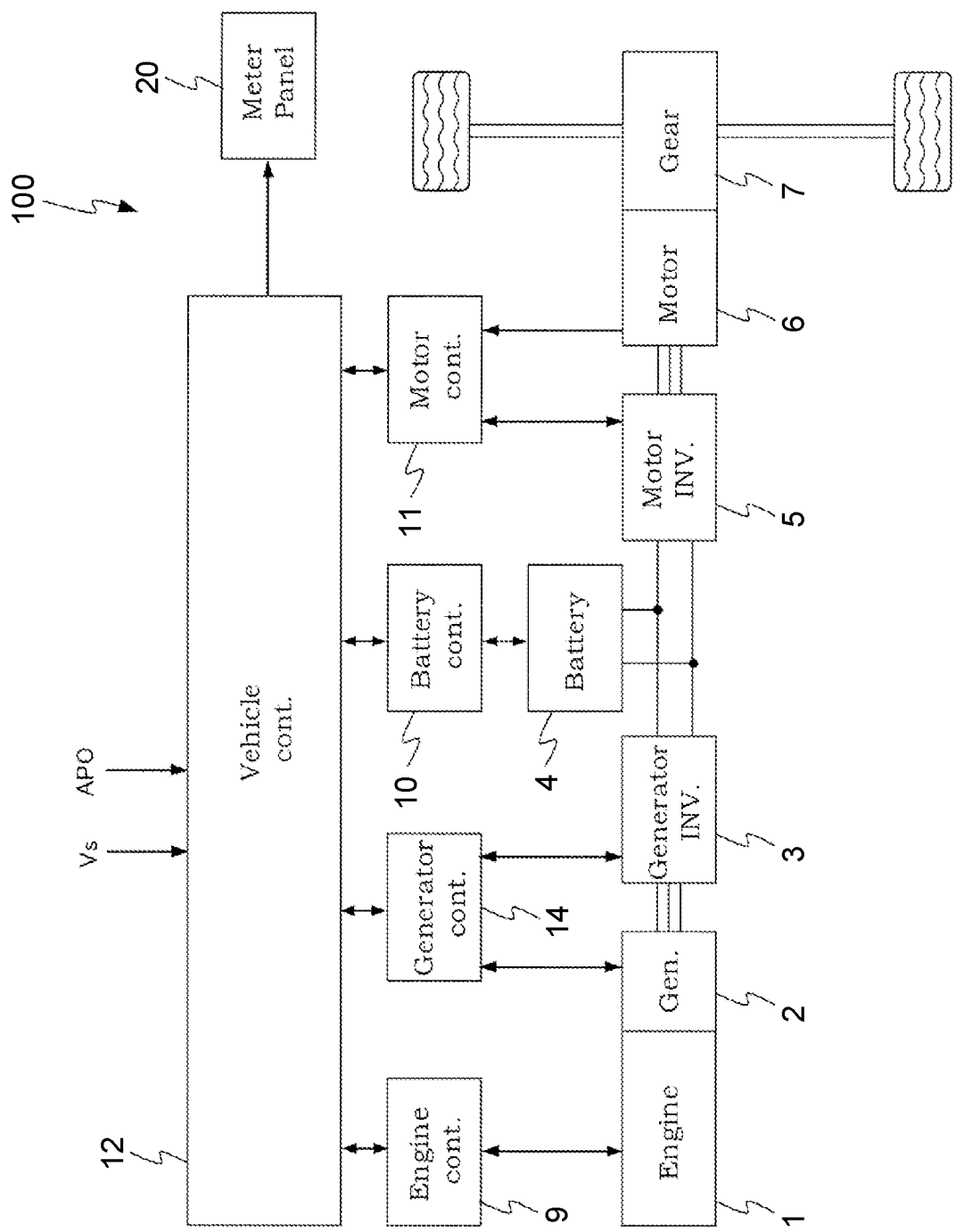
FIG. 1 is a view describing a schematic configuration of a hybrid vehicle in which a fuel economy display control method according to a first embodiment is executed.

FIG. 1 is a view describing a schematic configuration of a hybrid vehicle 100 in which a fuel economy display method according to the first embodiment is executed.

The hybrid vehicle 100 according to this embodiment is configured as a so-called series hybrid vehicle in which an engine 1 (an internal combustion engine) serving as an electric power generation device, a motor for electric power generation (hereinafter, referred to as a generator 2), and an electric motor (hereinafter, referred to as a travel motor 6) that generates driving force used for traveling are installed.

Further, the hybrid vehicle 100 according to this embodiment includes a generator inverter 3, a battery 4, a motor inverter 5, the travel motor 6, a reduction gear 7, an engine controller 9, a battery controller 10, a motor controller 11, a vehicle controller 12, a generator controller 14, and a meter panel 20.

The engine 1 is connected with the generator 2 through a non-illustrated gear and transmits power to the generator 2 so that the generator 2 generates electric power. This means that the engine 1 of the hybrid vehicle 100 is used as a driving source for the generator 2 to generate electric power.

Also, the generator 2 is configured so that, in accordance with a command from the generator controller 14, the generator 2 is able to perform cranking of the engine 1 when starting the engine 1, and motoring in which the engine 1 is rotated by power-running.

The generator inverter 3 is connected with the generator 2, the battery 4, and the motor inverter 5. Further, the generator inverter 3 converts alternating-current electric power generated by the generator 2 into direct-current electric power in accordance with a command from the generator controller 14. Furthermore, in accordance with a command from the generator controller 14, the generator inverter 3 converts direct-current electric power supplied from the battery 4 into alternating-current electric power and supplies the alternating-current electric power to the generator 2.

Based on a command from the motor controller 11, the motor inverter 5 converts direct-current electric power supplied from the battery 4 or the generator inverter 3 into the alternating-current electric power, and supplies the alternating-current electric power to the travel motor 6. Further, based on a command from the motor controller 11, the motor inverter 5 converts regenerative alternating-current electric power from the travel motor 6 into direct-current electric power and supplies the direct-current electric power to the battery 4.

The travel motor 6 generates driving force from the alternating current supplied from the motor inverter 5, and transmits driving force to driving wheels through the reduction gear 7. Further, the travel motor 6 generates regenerative driving force when the travel motor 6 is rotated with the driving wheels while the vehicle is decelerating, in a coast traveling, or the like. Thus, kinetic energy of the vehicle is recovered as electric energy.

The engine controller 9 adjusts an intake air quantity by a throttle actuator, and a fuel injection amount Fij by an injector so that an operating point (engine torque Te and engine revolution speed Ne) of the engine 1 is closer to an engine torque command value and an engine revolution speed command value received from the vehicle controller 12.

The battery controller 10 measures a SOC (a state of charge) based on current and voltage charged in and discharged from the battery 4, and transmits information of the measurement to the vehicle controller 12. Further, the battery controller 10 computes electric power that can be input to or output from the battery 4 in accordance with temperature of the battery 4, internal resistance, and the SOC, and transmits the calculated value to the vehicle controller 12.

The motor controller 11 performs switching control of the motor inverter 5 in accordance with states of revolution speed, voltage, and so on of the travel motor 6 so that travel motor torque realizes a motor torque command value from the vehicle controller 12.

The vehicle controller 12 computes a motor torque command value for the travel motor 6 based on information such as an accelerator position APO corresponding to an operation amount of an accelerator pedal by a driver, and vehicle speed Vs. Further, the vehicle controller 12 computes a motor output OP as output electric power of the travel motor 6 based on revolution speed, voltage, and a motor torque command value of the travel motor 6.

Further, the vehicle controller 12 computes target generated electric power for electric power generation with use of the engine 1, based on the motor output OP and the SOC. Further, while satisfying the target generated electric power, the vehicle controller 12 computes engine torque Te and engine revolution speed Ne of the engine 1 based on the SOC of the battery 4, sound vibration performance, and efficiency of the engine 1. Then the vehicle controller 12 transmits the computed engine torque Te and engine revolution speed Ne to the engine controller 9.

Further, the vehicle controller 12 computes a revolution speed command value corresponding to the engine revolution speed command value, and transmits the revolution speed command value to the generator controller 14.

The generator controller 14 performs switching control of the generator inverter 3 in accordance with a state of the generator 2 such as a detected value of revolution speed and voltage so that revolution speed of the generator coincides with the generator revolution speed command value from the vehicle controller 12.

The engine controller 9, the battery controller 10, the motor controller 11, the vehicle controller 12, and the generator controller 14 described above are configured as electric control units made of microcomputers, respectively, including various computing and control devices such as a CPU, various storage devices such as a ROM and RAM, input/output interfaces, and so on.

In particular, in this embodiment, the vehicle controller 12 is programmed so that a fuel economy display control method according to this embodiment can be executed.

The meter panel 20 is arranged inside the vehicle cabin of the hybrid vehicle 100. The meter panel 20 is realized by, for example, a liquid crystal display, an organic EL, and an LED, and is able to display various kinds of information in according with a driving state of the hybrid vehicle 100. The meter panel 20 is configured by, for example, a so-called instrument panel arranged in front of a driver's seat in the hybrid vehicle 100.

Figure 2:
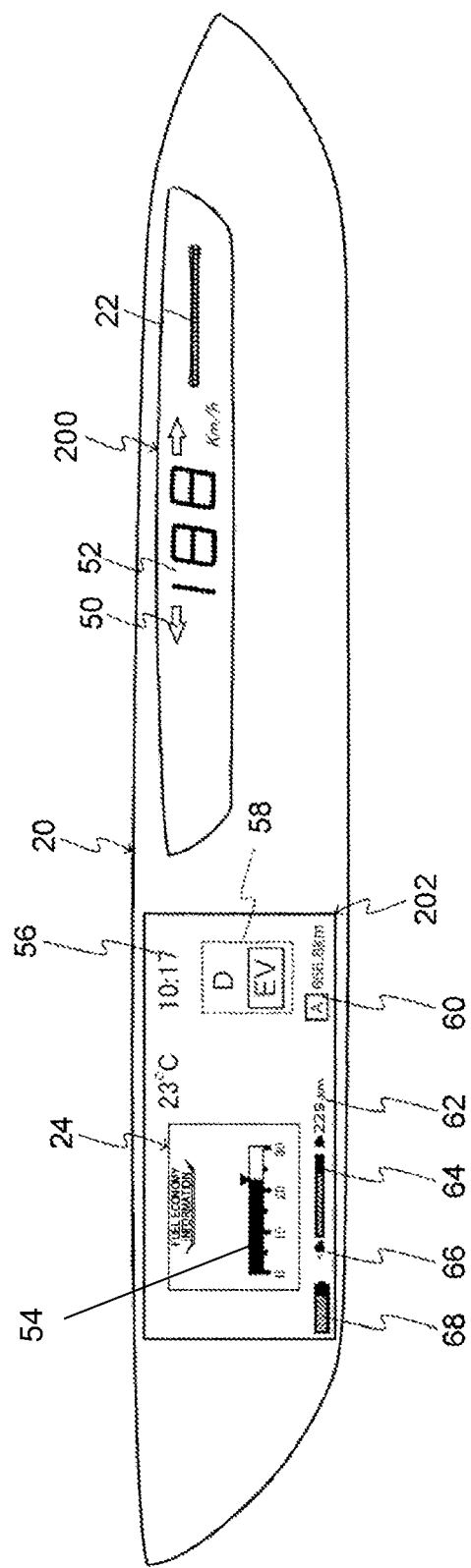
FIG. 2 is a view describing a display form of a meter panel according to the first embodiment.

FIG. 2 is a view describing a display form of the meter panel 20.

The meter panel 20 according to this embodiment includes a first display region 200 positioned in a rightward position in the drawing, and a second display region 202 positioned in a leftward position in the drawing.

The first display region 200 includes an eco-level gauge 22 that displays an eco-level indicating an extent of eco-driving according to a driving operation by the driver, and so on, a direction indication display part 50, a vehicle speed display part 52, and so on.

Further, the second display region 202 includes a vehicle energy state display part 54, a time display part 56, a travel mode display part 58 that displays a travel mode and a range that are currently set, a trip information display part 60 that displays a travel distance during a trip, a distance to empty display part 62 that displays a distance to empty based on a remaining quantity of fuel stored in an non-illustrated fuel tank for the engine 1 to generate electric power, a remaining fuel quantity display part 64 that shows a remaining quantity of fuel inside the fuel tank, a fuel filler opening position display part 66 that shows a position (a right-side position or a left-side position) in the hybrid vehicle 100 at which a fuel filler opening for fuel to be filled is installed, and a charge amount display part 68 that displays a charge amount (the SOC) of the battery 4.

In particular, in this embodiment, a fuel economy display screen 24 displaying later-described instantaneous fuel economy FCM_i is configured in the vehicle energy state display part 54.

Figure 3:
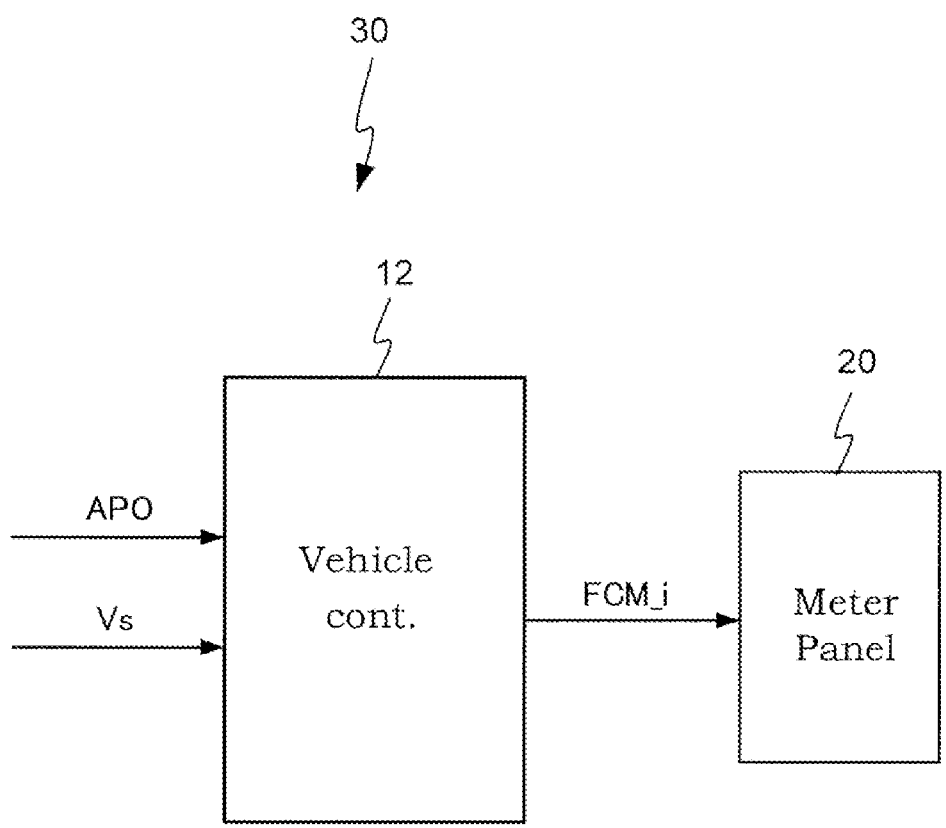
FIG. 3 is a block diagram describing a function of a fuel economy display control system according to the first embodiment.

FIG. 3 is a block diagram that describes a function of a fuel economy display control system 30 according to this embodiment.

As shown in the drawing, the fuel economy display control system 30 according to this embodiment is made of the vehicle controller 12 serving as a display control device, and the meter panel 20 serving as a display device.

Specifically, the vehicle controller 12 computes the instantaneous fuel economy FCM_i according to a later-described operating state of the engine 1 based on the accelerator position APO detected by a non-illustrated accelerator stroke sensor, and the vehicle speed Vs detected by a non-illustrated vehicle speed sensor. The vehicle controller 12 in this embodiment repeatedly executes computation of the instantaneous fuel economy FCM_i every given time (for example, five seconds), and the latest computation result is used as the instantaneous fuel economy FCM_i.

Further, the vehicle controller 12 transmits the computed instantaneous fuel economy FCM_i to the meter panel 20, and performs processing that causes the fuel economy display screen 24 of the meter panel 20 to display the instantaneous fuel economy FCM_i. The meter panel 20 displays the instantaneous fuel economy FCM_i based on a command from the vehicle controller 12. Hereinafter, processing pertaining to the fuel economy display control method is described in more detail.

Figure 4:
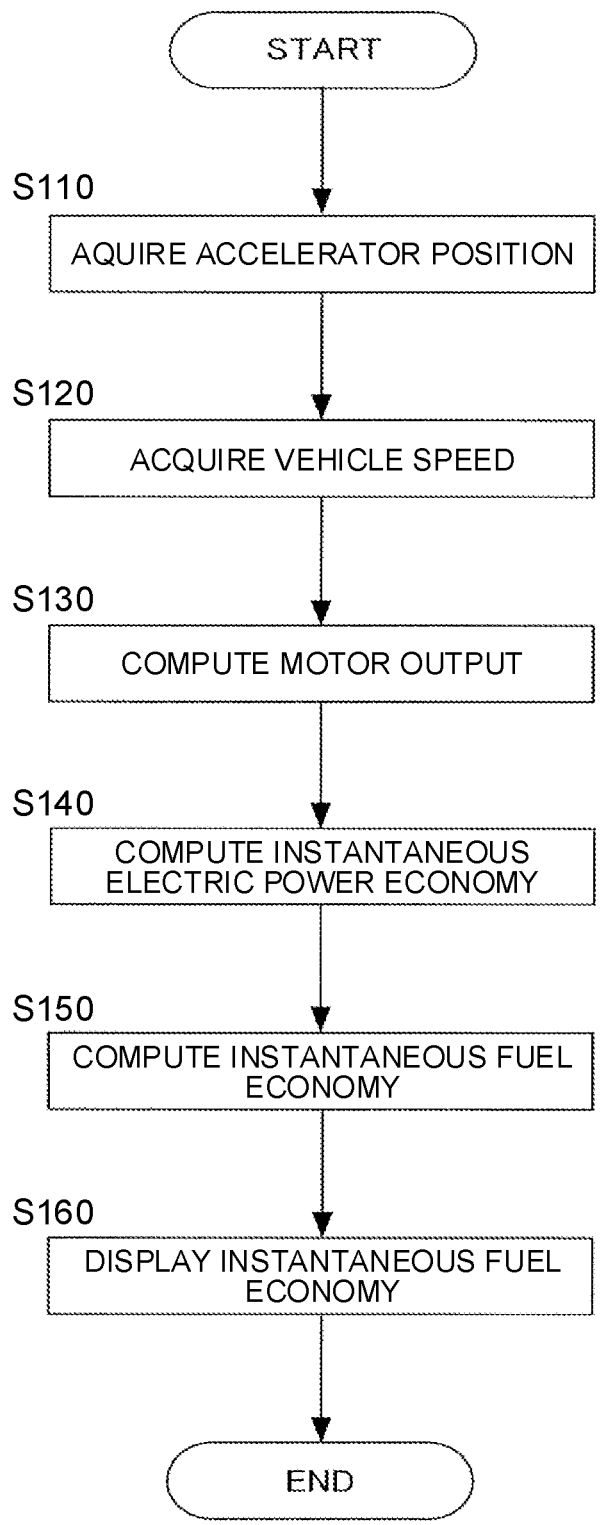
FIG. 4 is a flowchart describing a flow of the fuel economy display control method according to the first embodiment.

FIG. 4 is a flowchart describing a flow of the fuel economy display control method according to this embodiment. Each step shown in the flowchart is executed repeatedly at every given computing period. Further, the order of the steps may be changed to a possible extent.

In step S110 and step S120, the vehicle controller 12 acquires the accelerator position APO and the vehicle speed Vs, respectively.

In step S130, the vehicle controller 12 computes the motor output OP. Specifically, the vehicle controller 12 computes required electric power for the travel motor 6 as the motor output OP, the required electric power being calculated based on the accelerator position APO and the vehicle speed Vs acquired in the step S120, and the like.

In step S140, the vehicle controller 12 computes instantaneous electric power economy PCM_i based on the motor output OP and the vehicle speed Vs that are computed. Here, the instantaneous electric power economy PCM_i in this embodiment corresponds to a distance to empty of the hybrid vehicle 100 per unit electric power consumption when the computed motor output OP is realized. This means that the instantaneous electric power economy PCM_i changes sequentially in accordance with fluctuations of the motor output OP. The instantaneous electric power economy PCM_i can be expressed by, for example, a unit of [Km/Kwh] as evident from its definition. The vehicle controller 12 according to this embodiment repeatedly executes computation of the instantaneous electric power economy PCM_i every given time that is the same as the computation cycle period of the instantaneous fuel economy FCM_i, and uses the latest computation result as the instantaneous electric power economy PCM_i.

In this embodiment, in order to simply the description, the example is described in which computation of the instantaneous electric power economy PCM_i is executed assuming that electric power consumption of the hybrid vehicle 100 while traveling substantially corresponds to electric power consumption by driving of the travel motor 6. However, it is also possible to perform computation of the instantaneous electric power economy PCM_i in consideration of electric power consumption by various accessories such as a pump and a heater provided in the hybrid vehicle 100, in addition to the electric power consumption by driving of the travel motor 6.

In step S150, based on the instantaneous electric power economy PCM_i [Km/Kwh] computed in the step S140, the vehicle controller 12 computes the instantaneous fuel economy FCM_i [Km/L] in a case where the engine 1 is operated based on a set operating state.

Here, the instantaneous fuel economy FCM_i is a value obtained by converting the instantaneous electric power economy PCM_i (in other words, electric power consumption efficiency while the hybrid vehicle 100 is traveling) in accordance with the motor output OP of the hybrid vehicle 100 into a distance to empty per unit fuel consumption by electric power generation of the engine 1.

As described above, the instantaneous fuel economy FCM_i is defined as the distance to empty D per unit electric power consumption Wc in accordance with the motor output OP. Therefore, it is basically possible to obtain the instantaneous fuel economy FCM_i as a fuel consumption amount Fuc consumed by electric power generation in unit electric power consumption Wc is evaluated in a case where the engine 1 is operated at the set operating state (at an optimal fuel economy point, and so on), and then (the distance to empty D/the fuel consumption amount Fuc) is computed.

Meanwhile, in this embodiment, in the computation of the instantaneous fuel economy FCM_i, changes in the operating state of the engine 1 are taken into consideration, and improved accuracy of the computation of the instantaneous fuel economy FCM_i is thus achieved in comparison to simple computation of the instantaneous fuel economy FCM_i by the distance to empty Dpo/the fuel consumption amount Fuc described above.

Specifically, a conversion factor C_OP is used, in which changes in the operating state of the engine 1 in accordance with the SOC of the battery 4 are taken into consideration. To be in more detail, the vehicle controller 12 stores a conversion table in advance in the storage unit such as a memory in the vehicle controller 12, the conversion table determining the conversion factor C_OP for each motor output OP, then, the vehicle controller 12 extracts the conversion factor C_OP from the conversion table, the conversion factor C_OP corresponding to the motor output OP computed in the step S130.

Figure 5:
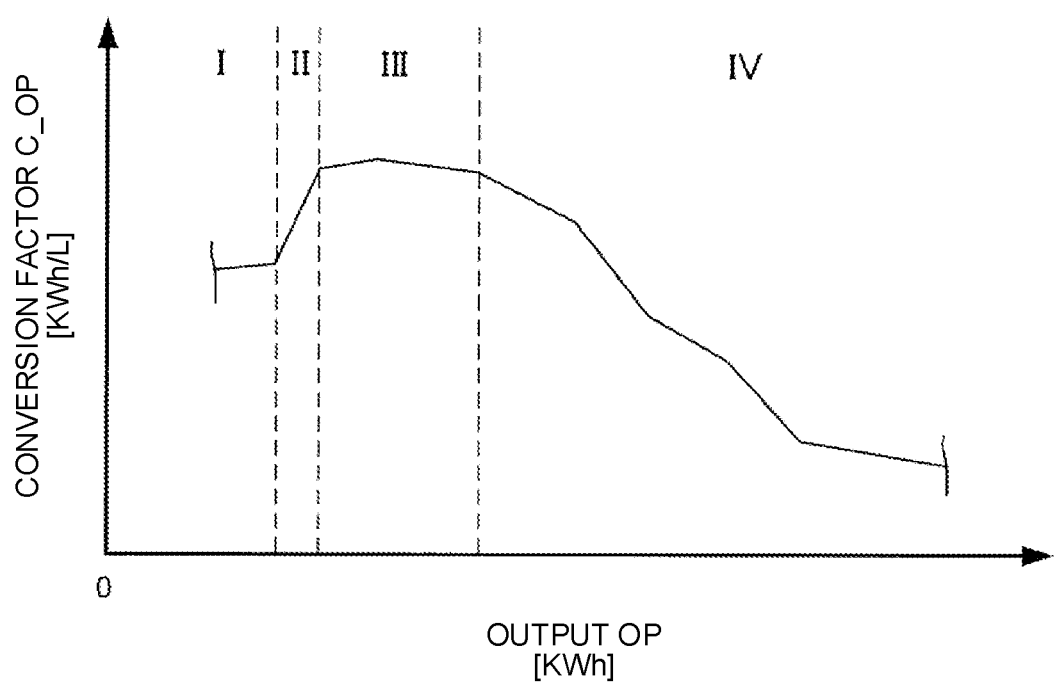
FIG. 5 is a view showing a conversion table that determines a conversion factor from instantaneous electric power economy to instantaneous fuel economy.

FIG. 5 is a view showing an example of the conversion table. The conversion table shows an example of the conversion factor C_OP (for example, 2.2 to 3.2 [Kwh/L]) set in accordance with a range of the motor output OP (for example, several Kwh to 60 Kwh) that can be acquired in a traveling scene of the hybrid vehicle 100. This conversion table is determined in advance based on, for example, characteristics in accordance with designs of the travel motor 6 and the engine 1.

Significance of the conversion factor C_OP shown in FIG. 5 is described. In the hybrid vehicle 100 in this embodiment, the engine 1 is used for electric power generation instead of being used as a driving source for traveling. Therefore, basically, an operating state of the engine 1 (the engine torque Te and the engine revolution speed Ne) is directly linked more to an increase and a decrease in the SOC of the battery 4 than to the motor output OP (the accelerator position APO) of the hybrid vehicle 100.

This means that, in the hybrid vehicle 100, basically, an electric power generation amount of the engine 1 is controlled depending on whether or not the SOC of the battery 4 is insufficient with respect to the motor output OP. Therefore, scenes are assumed where the operating state of the engine 1 is not changed with respect to changes of the motor output OP. For example, even when the motor output OP fluctuates in accordance with changes of the accelerator position APO, the operating state of the engine 1 is not changed when the SOC of the battery 4 is sufficient for the motor output OP before and after the fluctuation.

In particular, in the hybrid vehicle 100, even when the SOC is reduced and charging of the battery 4 is required, it is not basically necessary to make the operating state of the engine 1 follow fluctuations of the motor output OP, and it is thus possible for the engine 1 to generate electric power while maintaining the operating state of the engine 1 at a highly efficient operating point such as an optimal fuel economy point.

Therefore, in the hybrid vehicle 100, when the instantaneous fuel economy FCM_i is computed, it is possible to set the conversion factor C_OP at a constant value, supposing that the engine revolution speed Ne is constant with respect to changes of the motor output OP.

However, in a scene where the motor output OP is relatively large and the SOC becomes insufficient (see a region IV in FIG. 5) such as when a load is high, it is assumed that sufficient electric power for charging the battery 4 cannot be obtained even when the engine 1 is operated at the optimal fuel economy point. Therefore, in order to increase generated electric power, it is required that the engine 1 be operated in an operating state in which the engine 1 is operated in a higher revolution region than the optimal fuel economy point. As a result, efficiency of electric power generation by the engine 1 is lowered.

Meanwhile, on the contrary, in a scene where the motor output OP is relatively small and the SOC of the battery 4 is excessive (see a region II in FIG. 5) such as when a load is low, it is assumed that the SOC of the battery 4 becomes excessive when the engine 1 is operated at the optimal fuel economy point. In this case, it is basically unnecessary for the engine 1 to generate electric power, and the engine 1 may be stopped in consideration of a viewpoint of the SOC only.

However, even when the SOC is sufficient, there are instances where activation of the engine 1 may be required in a viewpoint of a warm-up requirement for an exhaust gas purifying catalyst of the engine 1, and so on. In this kind of case where the engine 1 is operated based on requirements in viewpoints other than the SOC even when the SOC of the battery 4 is sufficient, the SOC becomes excessive (electric power becomes surplus) when the engine 1 is operated at the optimal fuel economy point. Therefore, in this kind of scene, it is required to operate the engine 1 in a lower revolution region than the optimal fuel economy point in a viewpoint of suppression of electric power to be generated. Thus, efficiency of power generation by the engine 1 is lowered.

In consideration of changes in the operating state of the engine 1 caused by above, the conversion factor C_OP is set so that the lower the motor output OP becomes, the smaller the computed instantaneous fuel economy FCM_i becomes (the efficiency of electric power generation by the engine 1 gets lower) in a low load region II in which the motor output OP is relatively low. Further, in the high load region IV in which the motor output OP is relatively high, the conversion factor C_OP is set so that the higher the motor output OP becomes, the smaller the computed instantaneous fuel economy FCM_i becomes (the efficiency of electric power generation by the engine 1 gets lower).

In the medium load region III, it is determined that excessive insufficiency or a surplus of the SOC does not occur even if the engine 1 is operated at an operating state close to the optimal fuel economy point, and that the warm-up requirement for the exhaust gas purifying catalyst is satisfied, and the conversion factor C_OP is set to be the highest and almost constant with respect to fluctuations of the motor output OP.

Further, in an extremely low load region I, it is basically considered that the SOC does not become insufficient, and it is thus assumed that the engine 1 is stopped or operated based on minimum engine revolution speed Ne based on the warm-up requirement for the exhaust gas purifying catalyst. Therefore, in this case, assuming that the engine 1 is operated at constant engine revolution speed Ne that does not depend on changes of the motor output OP, the conversion factor C_OP is set to an almost constant value in accordance with the engine revolution speed Ne.

Then, the vehicle controller 12 computes the instantaneous fuel economy FCM_i [Km/L] by multiplying the instantaneous electric power economy PCM_i [Km/Kwh] computed in the step S140 by the set conversion factor C_OP [Kwh/L].

Thus, in the hybrid vehicle 100 in which the operating state of the engine 1 is not directly linked to the motor output OP (the accelerator position APO), it is possible to compute the instantaneous fuel economy FCM_i in accordance with the motor output OP.

In step S160, the vehicle controller 12 gives a command to the meter panel 20 to display the computed instantaneous fuel economy FCM_i. Specifically, the vehicle controller 12 gives a command to the meter panel 20 to display the computed instantaneous fuel economy FCM_i on the fuel economy display screen 24 (FIG. 2). Thus, the driver or the like inside the vehicle cabin is able to confirm display of the instantaneous fuel economy FCM_i on the fuel economy display screen 24 of the meter panel 20.

Figure 6:
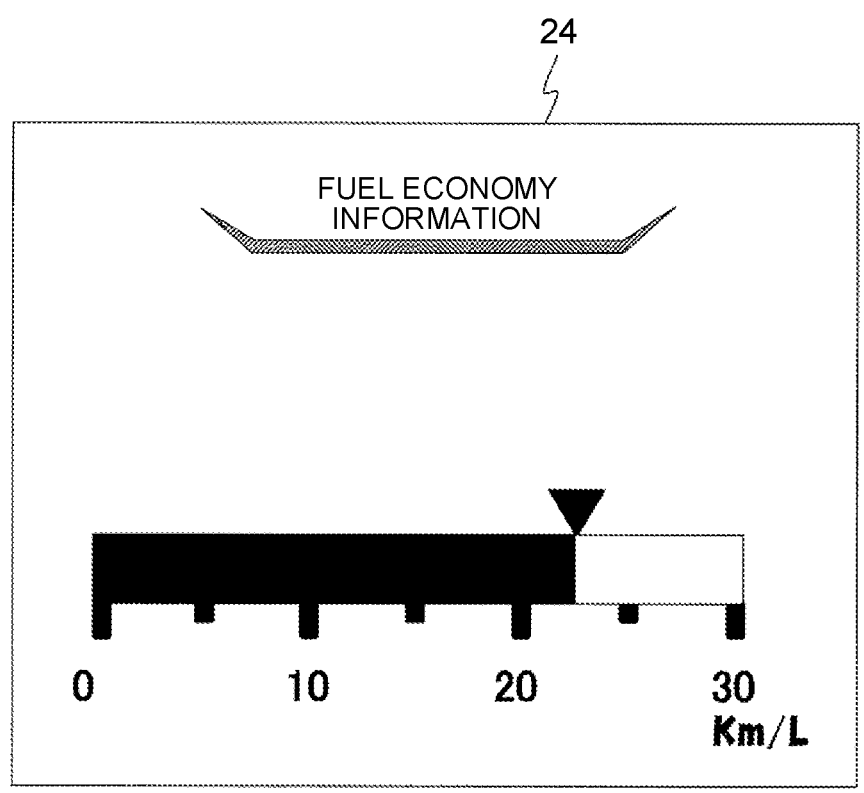
FIG. 6 is a view showing an example of a display form in a fuel economy display region according to the first embodiment.

FIG. 6 shows an example of the display form on the fuel economy display screen 24 of the meter panel 20 on which the instantaneous fuel economy FCM_i is displayed. With the display shown in the drawing, the driver or the like inside the vehicle cabin of the hybrid vehicle 100 is able to visually grasp the instantaneous fuel economy FCM_i.

As described already, the instantaneous fuel economy FCM_i in this embodiment is a value that fluctuates in conjunction with fluctuation of the accelerator position APO (the motor output OP) in accordance with the accelerator pedal operation amount by the driver. This means the instantaneous fuel economy FCM_i displayed on the meter panel 20 fluctuates in response to an accelerator pedal operation by the driver. Therefore, in the hybrid vehicle 100 in which the operating state of the engine 1 is not directly linked to the accelerator position APO, it is also possible to make the driver instinctively recognize the instantaneous fuel economy of the hybrid vehicle 100 in accordance with the driver's own accelerator pedal operation, and thus encourage the driver to be conscious of eco-driving.

With the fuel economy display control method according to the first embodiment described so far, the following effects are obtained.

As the fuel economy display control method according to this embodiment, provided is the fuel economy display control method for the hybrid vehicle 100 in which driving electric power supplied to the travel motor 6 from the battery 4 is generated by the engine 1 serving as the electric power generation device that generates electric power by consuming fuel (gasoline).

The fuel economy display control method includes an electric power economy computation step (the step S140 in FIG. 4) in which the instantaneous electric power economy PCM_i is computed in accordance with the motor output OP that is an output of the travel motor 6, a fuel economy computation step (the step S150 in FIG. 4) in which the instantaneous fuel economy FCM_i corresponding to the instantaneous electric power economy PCM_i is computed in accordance with the operating state (such as the engine revolution speed Ne based on the optimal fuel economy point) set for the engine 1, and a display step (the step S160 in FIG. 4) in which the instantaneous fuel economy FCM_i is displayed on the meter panel 20 serving as the display device arranged inside the vehicle cabin.

This means that, from the instantaneous electric power economy PCM_i in accordance with the motor output OP, the instantaneous fuel economy FCM_i corresponding to the instantaneous electric power economy PCM_i is computed, and displayed on the meter panel 20.

Thus, in the hybrid vehicle 100 in which the set operating state of the engine 1 is not directly linked to the motor output OP (the accelerator position APO), the driver is also able to grasp the instantaneous fuel economy FCM_i linked to the driver's own accelerator pedal operation in real time, and it is possible to encourage the driver to be conscious of eco-driving.

In particular, the operating state of the engine 1 is set based on the state of charge (SOC) of the battery 4. Because of this, it is possible to display more accurate instantaneous fuel economy FCM_i in which changes in the operating state of the engine 1 in accordance with the level of the SOC of the battery 4 is taken into consideration.

Further, in this embodiment, the conversion factor C_OP based on the operating state of the engine 1 (for example, the engine revolution speed Ne based on the SOC) restricted in accordance with the motor output OP is set (the step S150 in FIG. 4, and FIG. 5), and the instantaneous fuel economy FCM_i is obtained by multiplying the instantaneous electric power economy PCM_i by the conversion factor C_OP (the step S160 in FIG. 4).

This means that, even in a case where driving of the engine 1 at the engine revolution speed Ne deviated from the optimal fuel economy point is required in accordance with a scene where the operating state of the engine 1 is restricted such as excess or deficiency of the SOC of the battery 4 according to the size of the motor output OP, it is possible to obtain the instantaneous fuel economy FCM_i from the instantaneous electric power economy PCM_i by using the conversion factor C_OP in which weighting in accordance with the required revolution speed Ne of the engine 1 is taken into consideration, and to display the instantaneous fuel economy FCM_i on the meter panel 20.

Thus, the driver or the like is able to recognize the instantaneous fuel economy FCM_i that is linked to the accelerator position APO more favorably, and an effect of encouraging the driver to be conscious of eco-driving is improved even further.

Further, in this embodiment, the fuel economy display control system 30 for realizing the fuel economy display control method is provided.

To be in more detail, in this embodiment, provided is the fuel economy display control system 30 installed in the hybrid vehicle 100 in which electric power generated by the engine 1 serving as the electric power generation device that generates electric power by consuming fuel is charged in the battery 4, and driving electric power is supplied to the travel motor 6 from the battery 4.

This fuel economy display control system 30 includes the meter panel 20 (see FIG. 3) serving as the display device that displays a travel distance with respect to given fuel consumption as the instantaneous fuel economy FCM_i, and the vehicle controller 12 serving as the display control device in which the instantaneous fuel economy FCM_i is computed.

Then, the vehicle controller 12 computes the instantaneous electric power economy PCM_i from the travel distance with respect to the electric power consumption by the travel motor 6 (corresponding to the motor output OP), and causes the meter panel 20 to display a value as the instantaneous fuel economy FCM_i, the value being obtained by correcting the instantaneous electric power economy PCM_i with the conversion factor C_OP that is a given factor.

In particular, the operating state of the engine 1 is set based on the state of charge (the SOC) of the battery 4.

Further, in this embodiment, the vehicle controller 12 has the storage unit that stores the conversion table (FIG. 5) that determines the conversion factor C_OP as the given factor, the conversion factor C_OP being based on the operating state of the engine 1 restricted in accordance with the motor output OP. Also, the vehicle controller 12 extracts the conversion factor C_OP in accordance with the motor output OP from the conversion table, and obtains the instantaneous fuel economy FCM_i by multiplying the instantaneous electric power economy PCM_i by the extracted conversion factor C_OP.

With the fuel economy display control system 30 having the above-mentioned configuration, it is possible to favorably execute the fuel economy display control method.

Further, in this embodiment, provided is the fuel economy display control system 30 in another form installed in the hybrid vehicle 100 in which driving electric power supplied to the travel motor 6 from the battery 4 is generated by the engine 1 serving as the electric power generation device that generates electric power by consuming fuel (gasoline).

The fuel economy display control system 30 includes the vehicle controller 12 serving as the display control device, and the meter panel 20 serving as the display device that is arranged inside the hybrid vehicle 100 and performs display based on a command from the vehicle controller 12 (see FIG. 3).

Then, the vehicle controller 12 computes the instantaneous electric power economy PCM_i in accordance with an output of the travel motor 6 (the motor output OP). Further, the vehicle controller 12 computes the instantaneous fuel economy FCM_i corresponding to the instantaneous electric power economy PCM_i in accordance with the operating state set for the engine 1 (such as the engine revolution speed Ne based on the optimal fuel economy point), and causes the meter panel 20 to display the instantaneous fuel economy FCM_i.

With the fuel economy display control system 30 having the above configuration, it is also possible to execute the fuel economy display control method in a favorable manner.

Second Embodiment

Hereinafter, a second embodiment is described with reference to FIG. 7 to FIG. 10. The same reference numerals are used for components similar to those of the first embodiment, respectively, and description thereof is omitted.

In this embodiment, apart from the instantaneous fuel economy FCM_i described in the first embodiment, instantaneous real fuel economy FCM_r of the engine 1 is obtained based on the vehicle speed Vs of the hybrid vehicle 100 and the fuel injection amount Fij of the engine 1. Then, average real fuel economy FCM_r_a that is an average value of the instantaneous real fuel economy FCM_r is obtained, which is displayed on the fuel economy display screen 24 of the meter panel 20 together with the instantaneous fuel economy FCM_i. More specific description is given below.

Figure 7:
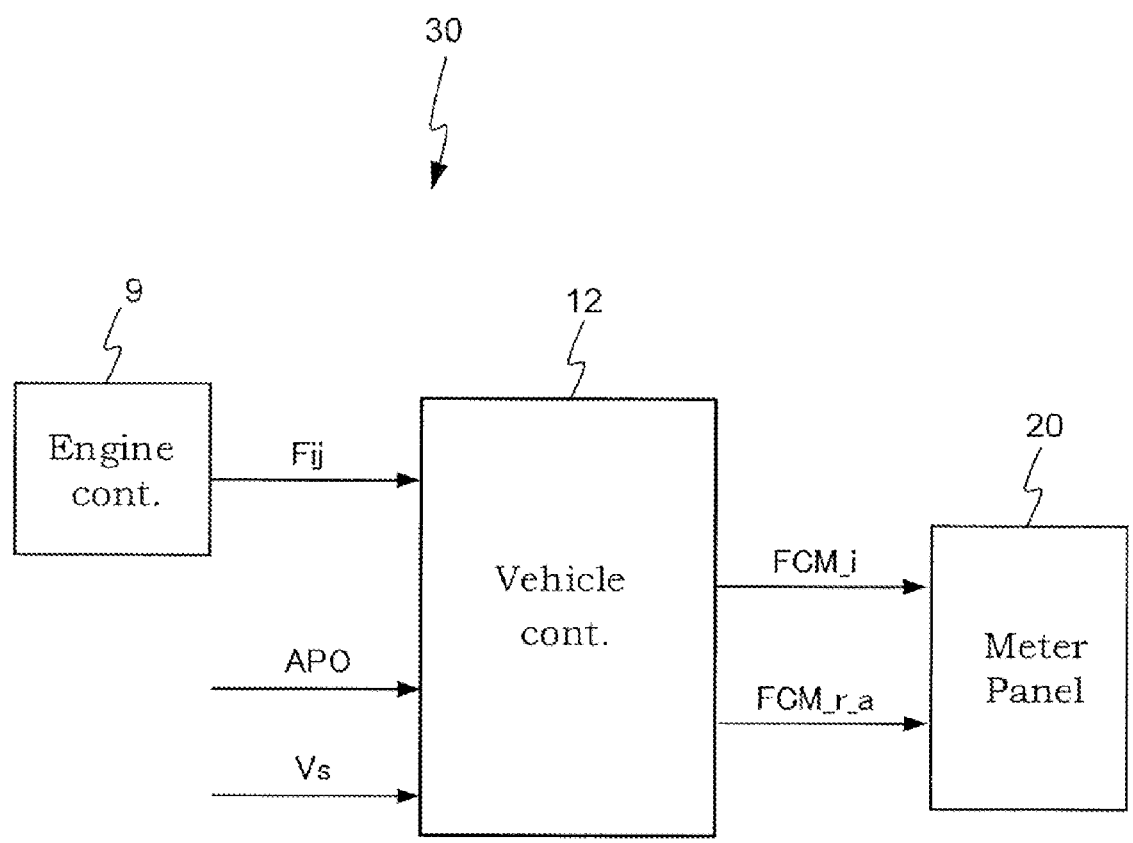
FIG. 7 is a block diagram describing a function of a fuel economy display control system according to a second embodiment.

FIG. 7 is a block diagram describing a function of a fuel economy display control system 30 according to this embodiment.

As shown in the drawing, the fuel economy display control system 30 in this embodiment includes an engine controller 9, a vehicle controller 12, and a meter panel 20.

Also, the vehicle controller 12 is programmed so that each processing of fuel economy display control in this embodiment can be executed. Specifically, the instantaneous fuel economy FCM_i is computed based on the accelerator position APO and the vehicle speed Vs, similarly to the first embodiment.

Further, in this embodiment, the vehicle controller 12 acquires a command value of the fuel injection amount Fij from the engine controller 9. Then, the vehicle controller 12 obtains the instantaneous real fuel economy FCM_r of the engine 1 based on the vehicle speed Vs and the fuel injection amount Fij.

Here, the instantaneous real fuel economy FCM_r is fuel economy calculated based on an actual fuel injection amount Fij of the engine 1, and the vehicle speed Vs. This means that, to be in more detail, the instantaneous real fuel economy FCM_r is computed as a value obtained by calculating a distance that the hybrid vehicle 100 is able to travel per unit fuel consumption amount based on the current fuel injection amount Fij (the fuel consumption amount) of the engine 1 and the current vehicle speed Vs. Further, the vehicle controller 12 in this embodiment computes the average real fuel economy FCM_r_a that is an average value of the instantaneous real fuel economy FCM_r.

Then, the vehicle controller 12 transmits the computed average real fuel economy FCM_r_a to the meter panel 20 together with the instantaneous fuel economy FCM_i described in the first embodiment, and gives a command to the fuel economy display screen 24 of the meter panel 20 to display the instantaneous fuel economy FCM_i and the average real fuel economy FCM_r_a in parallel to each other. Hereinafter, processing pertaining to the fuel economy display control method in this embodiment is described in more detail.

The vehicle controller 12 executes processing pertaining to computation of the instantaneous fuel economy FCM_i in the step S110 to step S150 of the flowchart described in FIG. 4 according to the first embodiment. Then, the vehicle controller 12 executes average real fuel economy display control in parallel to the processing pertaining to the computation of the instantaneous fuel economy FCM_i.

Figure 8:
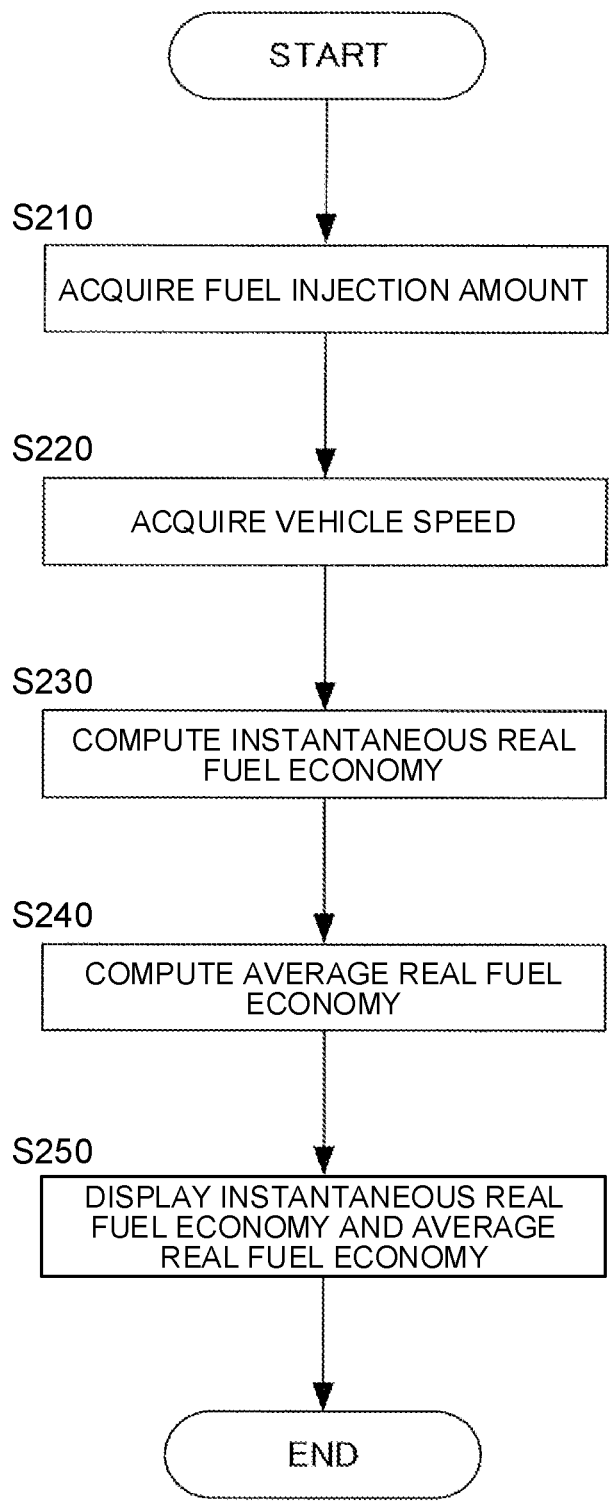
FIG. 8 is a flowchart showing a flow of display control for average real fuel economy.

FIG. 8 is a flowchart describing the flow of the average real fuel economy display control.

In step S210 and step S220, the vehicle controller 12 acquires the fuel injection amount Fij and the vehicle speed Vs.

In step S230, the vehicle controller 12 computes the instantaneous real fuel economy FCM_r. Specifically, the vehicle controller 12 computes the instantaneous real fuel economy FCM_r [Km/L] by dividing a value by the fuel injection amount Fij [L], the value being obtained by applying a given gain to the vehicle speed Vs as necessary.

In step S240, the vehicle controller 12 computes average real fuel economy FCM_r_a. Specifically, the vehicle controller 12 stores the instantaneous real fuel economy FCM_r [Km/L] successively at every given computing period on the basis of detection timing of an operation of a non-illustrated display reset button that is operated by a driver or the like. The average real fuel economy FCM_r_a is computed by calculating an average value from the sum total of the successively stored instantaneous real fuel economy FCM_r in all of the computing periods.

In step S250, the vehicle controller 12 gives a command to the meter panel 20 to display the instantaneous fuel economy FCM_i computed in the step S110 through the step S150, and the average real fuel economy FCM_r_a computed in the step S240. To be in more detail, the vehicle controller 12 gives a command to the meter panel 20 to display the instantaneous fuel economy FCM_i and the average real fuel economy FCM_r_a on the fuel economy display screen 24 (FIG. 2). Thus, both the instantaneous fuel economy FCM_i and the average real fuel economy FCM_r_a are displayed on the fuel economy display screen 24 of the meter panel 20 inside the vehicle cabin. Therefore, the driver or the like is able to confirm display of the average real fuel economy FCM_r_a as well as the instantaneous fuel economy FCM_i.

Figure 9:
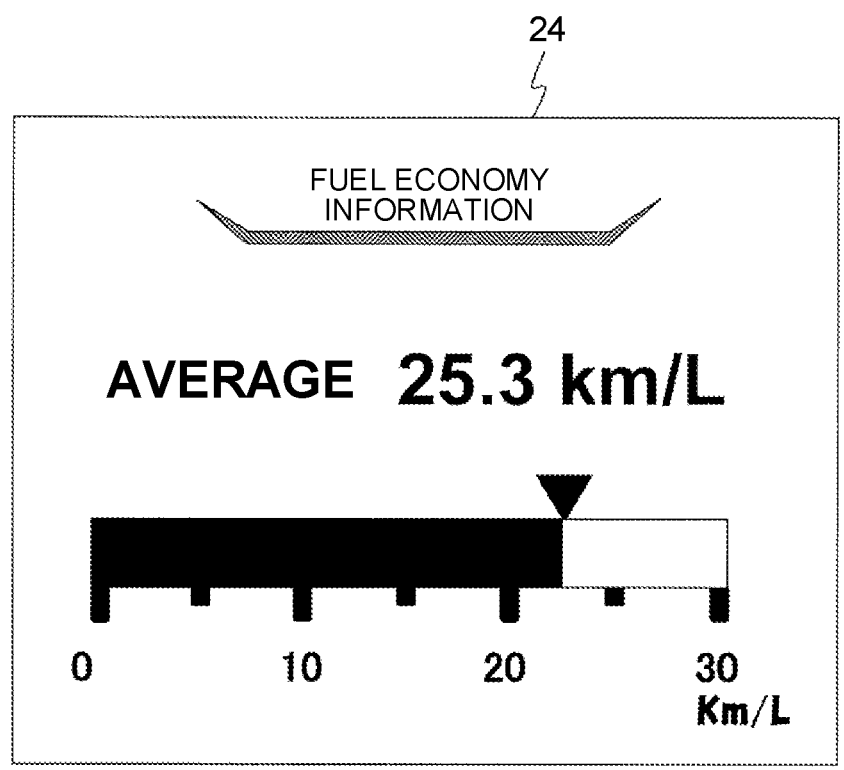
FIG. 9 is a view showing an example of a display form in a fuel economy display region according to the second embodiment.
Figure 10:
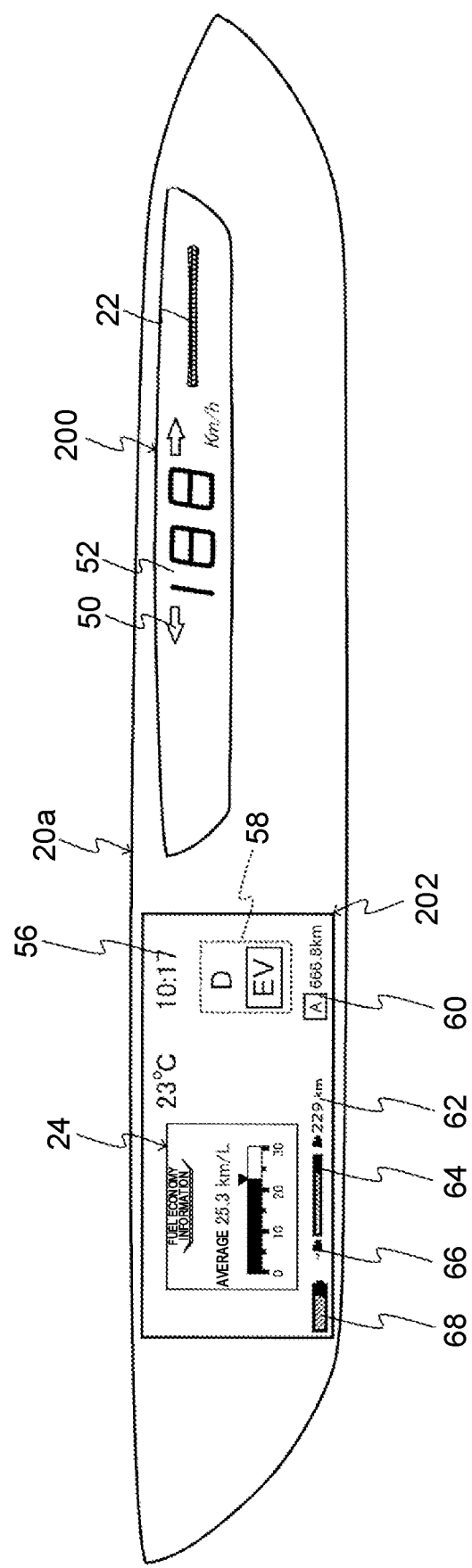
FIG. 10 is a view describing a display form of a meter panel according to the second embodiment.

FIG. 9 shows an example of a display form of the fuel economy display screen 24 in this embodiment. FIG. 10 is a view describing an entire display form of the meter panel 20 including the fuel economy display screen 24 in this embodiment.

As the fuel economy display shown in the drawings is performed, the driver inside the vehicle cabin of the hybrid vehicle 100 is able to visually grasp the average real fuel economy FCM_r_a in addition to the instantaneous fuel economy FCM_i that is linked to the driver's own accelerator pedal operation.

With the fuel economy display control method according to the second embodiment described above, the following effects are obtained.

In comparison to the fuel economy display control method according to the first embodiment, the fuel economy display control method according to this embodiment further includes an instantaneous real fuel economy and electric power economy computation step (the step S230 in FIG. 8) in which the instantaneous real fuel economy FCM_r is computed in accordance with the actual operating state of the engine 1 based on the vehicle speed Vs of the hybrid vehicle 100 and a fuel supply amount (the fuel injection amount Fij) to the engine 1, and an average real fuel economy and electric power economy computation step (the step S240 in FIG. 8) in which an average value of the instantaneous real fuel economy FCM_r during given time is computed as the average real fuel economy FCM_r_a. Then, in the display step (the step S250 in FIG. 8), the instantaneous fuel economy FCM_i and the average real fuel economy FCM_r_a are displayed.

As a result, through the meter panel 20, the driver of the hybrid vehicle 100 is able to recognize the average real fuel economy FCM_r_a in addition to the instantaneous fuel economy FCM_i that favorably fluctuates in conjunction with the driver's own accelerator pedal operation amount.

In particular, with the fuel economy display control method according to this embodiment, the instantaneous real fuel economy FCM_r is computed based on the fuel injection amount Fij corresponding to the fuel consumption amount in accordance with the actual operating state (electric power generation state) of the engine 1. Then, an average value of the instantaneous real fuel economy FCM_r during the given time is computed as the average real fuel economy FCM_r_a.

Here, as already described, in the hybrid vehicle 100 in the embodiment, since the operating state of the engine 1 basically does not follow fluctuations of the motor output OP, the driver's accelerator pedal operation amount is not necessarily linked to the operating state. On the contrary, the instantaneous real fuel economy FCM_r computed in this embodiment is determined from the fuel injection amount Fij in accordance with the actual operating state (electric power generation state) of the engine 1. Therefore, basically, the instantaneous real fuel economy FCM_r is not necessarily linked to the driver's accelerator pedal operation, either.

However, since the instantaneous real fuel economy FCM_r is computed directly from the fuel injection amount Fij in accordance with the actual operating state of the engine 1, the average real fuel economy FCM_r_a that is the average value of the instantaneous real fuel economy FCM_r during the given time is consistent with actual average fuel economy highly accurately.

Therefore, with the fuel economy display control method according to the embodiment, the instantaneous fuel economy FCM_i favorably linked to the accelerator pedal operation amount is displayed so that the driver is encouraged to be conscious of eco-driving, and, the average real fuel economy FCM_r_a that is in consistent with actual fuel economy in a more favorable manner is displayed so that the driver is able to recognize more accurate fuel economy information.

In particular, as shown in FIG. 9, the meter panel 20 is configured so as to display both the instantaneous fuel economy FCM_i and the average real fuel economy FCM_r_a to a degree that the driver is able to grasp them at a glance. Thus, in the hybrid vehicle 100 in which the engine 1 is used for electric power generation, it is possible to realize the display similar to display of the instantaneous fuel economy/average real fuel economy in a vehicle in which the conventional engine 1 serves as a traveling driving source.

As a result, even in the hybrid vehicle 100 such as a series hybrid vehicle in which the engine 1 is used for electric power generation, it is possible to provide display that gives little sense of discomfort to an occupant such as a driver in the hybrid vehicle 100 in comparison to the instantaneous fuel economy/average real fuel economy of the vehicle in which the existing engine 1 serves as the traveling power source.

Further, in this embodiment, provided is the fuel economy display control system 30 that realizes the fuel economy display control method according to this embodiment.

To be in more detail, provided is the fuel economy display control system 30 installed in the hybrid vehicle 100 in which the battery 4 is charged with electric power generated by the engine 1 that serves as the electric power generation device that generates electric power by consuming fuel, and driving electric power is supplied from the battery 4 to the travel motor 6.

The fuel economy display control system 30 includes the meter panel 20 (see FIG. 3) serving as the display device that displays a travel distance with respect to given fuel consumption as the instantaneous fuel economy FCM_i, and the vehicle controller 12 serving as the display control device that computes the instantaneous fuel economy FCM_i.

Then, the vehicle controller 12 computes the instantaneous electric power economy PCM_i from the travel distance with respect to the electric power consumption (corresponding to the motor output OP) of the travel motor 6, and displays a value as the instantaneous fuel economy FCM_i on the meter panel 20, the value being obtained by correcting the instantaneous electric power economy PCM_i with the conversion factor C_OP that is a given factor.

Further, the vehicle controller 12 in this embodiment computes the instantaneous real fuel economy FCM_r in accordance with the actual operating state of the engine 1 based on the vehicle speed Vs of the hybrid vehicle 100 and the fuel supply amount (the fuel injection amount Fij) to the engine 1, and computes the average value of the instantaneous real fuel economy FCM_r during the given period as the average real fuel economy FCM_r_a. Then, in the display step (the step S250 in FIG. 8), the instantaneous fuel economy FCM_i and the average real fuel economy FCM_r_a are displayed.

With the fuel economy display control system 30 having the above configuration, it is possible to favorably execute the fuel economy display control method in this embodiment.

Although each of the embodiments according to the invention is described so far, the embodiments show only some application examples of the invention, and are not intended to limit the technical scope of the invention to the specific configurations according to the foregoing embodiments.

A display controller that has a function of executing the fuel economy display control method in the above embodiments may be provided separately, instead of the vehicle controller 12. Also, the processing regarding the fuel economy display control method may be distributed to the vehicle controller 12 and this display controller to be executed.

The example is described in which the instantaneous fuel economy FCM_i according to the foregoing embodiments is computed by multiplying the instantaneous electric power economy PCM_i computed based on the motor output OP by the conversion factor C_OP described in FIG. 5. However, the computation method for the instantaneous fuel economy FCM_i is not limited to this, and a different computation method may be used.

As the different computation method for the instantaneous fuel economy FCM_i, for example, supposing that the vehicle controller 12 has been operated for given time (for example, five seconds) based on the operating state (the engine revolution speed Ne) of the engine 1, the operating state being set in accordance with target generated electric power, a predictive value of an amount of fuel sent to a fuel injection valve from a fuel pump by the operation of the vehicle controller 12, and a predictive value of a travel distance during the given time based on the vehicle speed Vs may be calculated, and then the instantaneous fuel economy FCM_i may be computed by dividing the predictive value of the amount of fuel by the predictive value of the travel distance.

Further, the technical scope of the invention includes a subject matter that is the fuel economy display control system 30. The fuel economy display control system 30 is installed in the hybrid vehicle 100 in which the battery 4 is charged with electric power generated by an electric power generation device (for example, the engine 1) that generates electric power by consuming fuel, and driving electric power is supplied to the travel motor 6 from the battery 4. The fuel economy display control system 30 includes the meter panel 20 serving as the display device that displays a travel distance with respect to given fuel consumption as the instantaneous fuel economy FCM_i, and the vehicle controller 12 serving as the display control device that computes the instantaneous fuel economy FCM_i, in which the vehicle controller 12 computes the instantaneous electric power economy PCM_i from the travel distance with respect to electric power consumption (corresponding to the motor output OP) of the travel motor 6, the vehicle controller 12 computes the instantaneous electric power economy PCM_i from the travel distance with respect to electric power consumption (corresponding to the motor output OP) of the travel motor 6, and the instantaneous electric power economy PCM_i is displayed on the meter panel 20 as the instantaneous fuel economy FCM_i (by converting a dimension).

In the above embodiments, in a viewpoint of simplifying description, the description is given while focusing on a case where the motor output OP is a positive value (this means a case where electric power is consumed when the hybrid vehicle 100 travels) in the computation of the instantaneous fuel economy FCM_i. However, the invention is not limited to this, and the fuel economy display control method in the embodiments is also applicable in the case where the motor output OP is a negative value (during regeneration). For example, the conversion factor C_OP may be set to zero during regeneration, and the instantaneous fuel economy FCM_i may be displayed as "0" on the meter panel 20 during the regeneration.

Also, in the foregoing embodiments, the example is described in which the fuel economy display screen 24 is configured in the second display region 202 of the meter panel 20a shown in FIG. 2. Meanwhile, the vehicle controller 12 and the meter panel 20a may be configured so that the fuel economy display screen 24 in the second display region 202 is switched to a screen that shows other vehicle states in accordance with a switching operation by a driver or the like in the hybrid vehicle 100.

For example, the meter panel 20a may be configured so that the screen displayed on the second display region 202 can be switched in accordance with a command from the switching operation by the driver or the like, or the vehicle controller 12, the screen displayed on the second display region 202 being switched among the fuel economy display screen 24, an energy flow display screen that displays a flow of electric power among the engine 1, the battery 4, and the travel motor 6, an odometer display screen that displays a cumulative travel distance and a travel distance during a trip, a display screen for information of charge history of the battery 4 by regeneration and electric power generation by the engine 1, and a power meter display screen that displays driving electric power and regenerative electric power of the hybrid vehicle 100 based on the charging and discharging electric power of the battery 4 and so on.

Furthermore, in the embodiments, the example is described in which the hybrid vehicle 100 is a series hybrid vehicle in which the engine 1 is driven for electric power generation, and is not used as a driving source for traveling.

However, in a vehicle in which the engine 1 is used for both electric power generation and as the traveling driving source and it is possible to select a mode in which the engine 1 is operated for electric power generation or a mode in which the engine 1 is used as the traveling driving source, the fuel economy display control method in the embodiments may be applicable in the mode in which the engine 1 is operated for electric power generation.

Further, in the embodiments, the example of the hybrid vehicle 100 is described in which driving electric power supplied to the travel motor 6 from the battery 4 is generated by the engine 1 that generates electric power by consuming fuel (gasoline). However, the configurations of the fuel economy display control method or the fuel economy display control system 30 described above may be applied to a hybrid vehicle in which driving electric power supplied to the travel motor 6 from the battery 4 is generated by another electric power generation device that generates electric power by consuming fuel other than gasoline.

For example, the configuration of the embodiments may be applied to a vehicle in which a fuel cell battery such as an SOFC (a solid oxide fuel cell) is installed as the electric power generation device. This means that the fuel economy display control method described in the foregoing embodiments may be applied to a hybrid vehicle (a range extender vehicle) in which driving electric power supplied to a travel motor from a battery is generated by a fuel cell battery that generates electric power by consuming fuel such as alcohol mixed water. For example, instantaneous electric power economy in accordance with an output of the travel motor may be computed, instantaneous fuel economy corresponding the above instantaneous electric power economy may be computed in accordance with an operating state (target current, and so on) set for the SOFC, and the computed instantaneous fuel economy may be displayed on a display device arranged inside a vehicle cabin.

The invention claimed is:

1. A fuel economy display control method for a hybrid vehicle in which driving electric power supplied to a travel motor from a battery is generated by an engine, the fuel economy display control method being executed in a series hybrid mode in which the hybrid vehicle travels only with driving force of the travel motor without using the engine as a traveling driving source, the fuel economy display control method comprising:
    an electric power economy computation step in which an output of the travel motor is computed from an accelerator position in accordance with an accelerator pedal operation amount and instantaneous electric power economy is computed according to the output of the travel motor when the vehicle is decelerating or coast traveling;
    a fuel economy computation step in which instantaneous fuel economy is computed by a conversion factor from the instantaneous electric power economy, the conversion factor set in accordance with an operating state set for the engine, wherein the operating state is determined from a target generated electric power for electric generation by the engine; and
    a display step in which the instantaneous fuel economy is displayed on a display device arranged inside a vehicle cabin.

2. The fuel economy display control method according to claim 1, wherein the conversion factor is set based on a change of the operating state of the engine in accordance with the output of the travel motor.

3. The fuel economy display control method according to claim 1, wherein the operating state of the engine is set based on a state of charge of the battery.

4. The fuel economy display control method according to claim 1, further comprising:
- an instantaneous real fuel economy computation step in which instantaneous real fuel economy in accordance with an actual operating state of the engine is computed based on vehicle speed of the hybrid vehicle and a fuel supply amount to the engine; and
- an average real fuel economy computation step in which an average value of the instantaneous real fuel economy during a given time is computed as average real fuel economy, wherein, in the display step, the instantaneous fuel economy and the average real fuel economy are displayed on the display device.

5. The fuel economy display control method according to claim 1, further comprising detecting the accelerator position using a sensor.

6. The fuel economy display control method according to claim 1, further comprising computing a motor torque command value for the travel motor based on the accelerator position and vehicle speed.

7. The fuel economy display control method according to claim 6, wherein computing the output of the travel motor is based on the motor torque command value.

8. The fuel economy display control method according to claim 7, wherein computing the output of the travel motor is further based on engine revolution speed and voltage.

9. The fuel economy display control method according to claim 8, further comprising measuring a state of charge of the battery based on current and voltage charged in and discharged from the battery.

10. The fuel economy display control method according to claim 9, further comprising computing the target generated electric power based on the output of the travel motor and the state of charge of the battery.

11. The fuel economy display control method according to claim 10, further comprising computing engine torque and the engine revolution speed based on the state of charge of the battery, sound vibration performance, and efficiency of the engine.

12. The fuel economy display control method according to claim 1, wherein computing the instantaneous fuel economy is performed repeatedly in given intervals of time.

13. The fuel economy display control method according to claim 1, further comprising converting the instantaneous electric power economy into a distance to empty.

14. The fuel economy display control method according to claim 13, further comprising changing the distance to empty in accordance with fluctuations in the output of the travel motor.

15. The fuel economy display control method according to claim 1, further comprising accessing a conversion table stored in memory in the vehicle.

16. The fuel economy display control method according to claim 15, further comprising extracting the conversion factor from the conversion table based on the output of the travel motor.

17. A fuel economy display control method for a hybrid vehicle in which driving electric power supplied to a travel motor from a battery is generated by an engine, the fuel economy display control method being executed in a series hybrid mode in which the hybrid vehicle travels only with driving force of the travel motor without using the engine as a traveling driving source, the fuel economy display control method comprising:
- an electric power economy computation step in which an output of the travel motor is computed from an accelerator position in accordance with an accelerator pedal operation amount and instantaneous electric power economy is computed according to the output of the travel motor in response to when the travel motor generates driving force by being supplied current and transmits the driving force to the driving wheels;
- a fuel economy computation step in which instantaneous fuel economy is computed by a conversion factor from the instantaneous electric power economy, the conversion factor set in accordance with an operating state set for the engine, wherein the operating state is determined from a target generated electric power for electric generation by the engine; and
- a display step in which the instantaneous fuel economy is displayed on a display device arranged inside a vehicle cabin.

18. A fuel economy display control method for a hybrid vehicle in which driving electric power supplied to a travel motor from a battery is generated by an engine, the fuel economy display control method being executed in a series hybrid mode in which the hybrid vehicle travels only with driving force of the travel motor without using the engine as a traveling driving source, the fuel economy display control method comprising:
- an electric power economy computation step in which an output of the travel motor is computed from an accelerator position in accordance with an accelerator pedal operation amount and instantaneous electric power economy is computed according to the output of the travel motor in response to when the vehicle is decelerating, in coast traveling, or when the motor output is greater than 0;
- a fuel economy computation step in which instantaneous fuel economy is computed by a conversion factor from the instantaneous electric power economy, the conversion factor set in accordance with an operating state set for the engine, wherein the operating state is determined from a target generated electric power for electric generation by the engine; and
- a display step in which the instantaneous fuel economy is displayed on a display device arranged inside a vehicle cabin.

19. The fuel economy display control method according to claim 18, further comprising accessing a conversion table stored in memory in the vehicle.

20. The fuel economy display control method according to claim 19, further comprising extracting the conversion factor from the conversion table based on the output of the travel motor.

* * * * *